United States Patent
Ueda et al.

(10) Patent No.: US 11,063,298 B2
(45) Date of Patent: *Jul. 13, 2021

(54) SEMISOLID ELECTROLYTE SOLUTION, SEMISOLID ELECTROLYTE, SEMISOLID ELECTROLYTE LAYER, ELECTRODE, AND SECONDARY BATTERY

(71) Applicant: Hitachi, Ltd., Tokyo (JP)

(72) Inventors: Suguru Ueda, Tokyo (JP); Atsushi Unemoto, Tokyo (JP); Akihide Tanaka, Tokyo (JP); Atsushi Iijima, Tokyo (JP); Jun Kawaji, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/605,527

(22) PCT Filed: Mar. 16, 2018

(86) PCT No.: PCT/JP2018/010429
§ 371 (c)(1),
(2) Date: Oct. 16, 2019

(87) PCT Pub. No.: WO2018/225328
PCT Pub. Date: Dec. 13, 2018

(65) Prior Publication Data
US 2020/0119404 A1   Apr. 16, 2020

(30) Foreign Application Priority Data
Jun. 8, 2017 (JP) .............................. JP2017-113117

(51) Int. Cl.
*H01M 10/0569* (2010.01)
*H01M 10/0567* (2010.01)
(Continued)

(52) U.S. Cl.
CPC .... *H01M 10/0569* (2013.01); *H01M 10/0567* (2013.01); *H01M 10/0568* (2013.01); *H01M 2004/027* (2013.01); *H01M 2004/028* (2013.01)

(58) Field of Classification Search
CPC ......... H01M 10/0525; H01M 10/0567; H01M 10/0568; H01M 10/0569; H01M 2004/027; H01M 2004/028
See application file for complete search history.

(56) References Cited

U.S. PATENT DOCUMENTS

| 5,223,353 A | 6/1993 | Ohsawa et al. |
| 2015/0024248 A1* | 1/2015 | He .................. H01M 10/056 429/144 |

(Continued)

FOREIGN PATENT DOCUMENTS

| JP | 2004-327362 A | 11/2004 |
| JP | 2006-196464 A | 7/2006 |

(Continued)

OTHER PUBLICATIONS

International Search Report (PCT/ISA/210) issued in PCT Application No. PCT/JP2018/010429 dated Jun. 19, 2018 with English translation (four (4) pages).

(Continued)

*Primary Examiner* — Carlos Barcena
(74) *Attorney, Agent, or Firm* — Crowell & Moring LLP

(57) ABSTRACT

Provided is a semisolid electrolyte solution to improve a battery capacity of a secondary battery. The semisolid electrolyte solution includes: a solvated electrolyte salt; and an ether-based solvent that constitutes the solvated electrolyte salt and a solvated ion liquid, in which a mixing ratio of the ether-based solvent to the solvated electrolyte salt is larger than 0 and equal to or less than 0.5 in terms of a molar ratio. Desirably, the mixing ratio of the ether-based solvent to the (Continued)

solvated electrolyte salt is 0.2 to 0.5 in terms of the molar ratio. When a low viscosity solvent is provided, a mixing ratio of the low viscosity solvent to the solvated electrolyte salt is 2 to 6 in terms of the molar ratio.

9 Claims, 2 Drawing Sheets

(51) Int. Cl.
*H01M 10/0568* (2010.01)
*H01M 4/02* (2006.01)

(56) References Cited

U.S. PATENT DOCUMENTS

2015/0364773 A1* 12/2015 Tamirisa ........... H01M 10/0565
429/163
2017/0084949 A1   3/2017 Yokoyama et al.
2018/0175375 A1   6/2018 Lecuyer et al.
2019/0140322 A1* 5/2019 Ren ....................... H01M 4/133

FOREIGN PATENT DOCUMENTS

| JP | 2009-245911 A | 10/2009 |
| JP | 2015-216124 A | 12/2015 |
| JP | 2017-59432 A  | 3/2017  |
| JP | 2017-509120 A | 3/2017  |

OTHER PUBLICATIONS

Japanese-language Written Opinion (PCT/ISA/237) issued in PCT Application No. PCT/JP2018/010429 dated Jun. 19, 2018 (four (4) pages).

* cited by examiner

Fig. 2

| | NEGATIVE ELECTRODE | POSITIVE ELECTRODE | MOLAR RATIO ||| B/A | C/A | INITIAL COULOMBIC EFFICIENCY [%] | COULOMBIC EFFICIENCY AT 10 CYCLES [%] |
| | | | (A) SOLVATED ELECTROLYTE SALT | (B) ETHER-BASED SOLVENT | (C) LOW VISCOSITY SOLVENT | | | | |
|---|---|---|---|---|---|---|---|---|---|
| EXAMPLE 1 | GRAPHITE | Li METAL | 1 | 0.5 | 4 | 0.5 | 4.0 | 85.0 | 99.2 |
| EXAMPLE 2 | GRAPHITE | Li METAL | 1 | 0.2 | 4 | 0.2 | 4.0 | 88.0 | 99.1 |
| EXAMPLE 3 | GRAPHITE | Li METAL | 1 | 0.2 | 3 | 0.2 | 3.0 | 83.0 | 99.0 |
| EXAMPLE 4 | GRAPHITE | Li METAL | 1 | 0.4 | 4 | 0.4 | 4.0 | 83.0 | 98.9 |
| EXAMPLE 5 | GRAPHITE | NCM | 1 | 0.5 | 4 | 0.5 | 4.0 | 84.0 | 99.1 |
| EXAMPLE 6 | GRAPHITE | NCM | 1 | 0.4 | 3 | 0.4 | 3.0 | 83.0 | 98.9 |
| EXAMPLE 7 | GRAPHITE | NCM | 1 | 0.4 | 2 | 0.4 | 2.0 | 83.0 | 99.0 |
| EXAMPLE 8 | GRAPHITE | NCM | 1 | 0.3 | 4 | 0.3 | 4.0 | 84.0 | 99.4 |
| EXAMPLE 9 | GRAPHITE | NCM | 1 | 0.3 | 2 | 0.3 | 2.0 | 85.0 | 99.3 |
| EXAMPLE 10 | GRAPHITE | NCM | 1 | 0.2 | 4 | 0.2 | 4.0 | 84.0 | 99.2 |
| EXAMPLE 11 | GRAPHITE | NCM | 1 | 0.2 | 3 | 0.2 | 3.0 | 83.0 | 99.3 |
| EXAMPLE 12 | GRAPHITE | NCM | 1 | 0.2 | 2 | 0.2 | 2.0 | 83.0 | 99.4 |
| EXAMPLE 13 | GRAPHITE | NCM | 1 | 0.5 | 4 | 0.5 | 4.0 | 85.0 | 99.2 |
| EXAMPLE 14 | GRAPHITE | NCM | 1 | 0.25 | 4 | 0.25 | 4.0 | 82.0 | 99.1 |
| COMPARATIVE EXAMPLE 1 | GRAPHITE | Li METAL | 1 | 1 | 0 | 1 | 0.0 | 65.0 | 90.0 |
| COMPARATIVE EXAMPLE 2 | GRAPHITE | Li METAL | 1 | 0 | 3 | 0 | 3.0 | 0.0 | 0.0 |
| COMPARATIVE EXAMPLE 3 | GRAPHITE | Li METAL | 1 | 0 | 4 | 0 | 4.0 | 0.0 | 0.0 |
| COMPARATIVE EXAMPLE 4 | GRAPHITE | Li METAL | 1 | 0 | 8 | 0 | 8.0 | 0.0 | 0.0 |
| COMPARATIVE EXAMPLE 5 | GRAPHITE | Li METAL | 1 | 1 | 1 | 1 | 1.0 | 80.0 | 98.2 |
| COMPARATIVE EXAMPLE 6 | GRAPHITE | Li METAL | 1 | 1 | 2 | 1 | 2.0 | 78.0 | 97.9 |

SEMISOLID ELECTROLYTE SOLUTION, SEMISOLID ELECTROLYTE, SEMISOLID ELECTROLYTE LAYER, ELECTRODE, AND SECONDARY BATTERY

TECHNICAL FIELD

The present invention relates to a semisolid electrolyte solution, a semisolid electrolyte, a semisolid electrolyte layer, an electrode, and a secondary battery.

BACKGROUND ART

A lithium secondary battery capable of realizing a high voltage and a high energy density is used in a wide range of applications from an in-vehicle usage such as an electric vehicle or a hybrid vehicle to a personal computer or a portable communication device.

A central problem in research and development of the lithium secondary battery is coexistence of further improvement in energy density and improvement in safety and reliability of the battery itself. In particular, when organic electrolyte solution having a low boiling point and a low flash point is used as an electrolyte as in a lithium secondary battery in related art, there is a safety problem such as leakage of combustible electrolyte solution or a short circuit.

In order to improve thermodynamic stability of such electrolyte solution, a semisolid electrolyte obtained by semisolidifying organic electrolytic solution using oxide particles has also been proposed. In addition, as a method for improving safety such as high volatility and low flash point, a usage of an organic solvent having a high boiling point and a high flash point as the electrolytic solution has been discussed. Patent Literature 1 discloses a method of improving battery life by using a glyme other than tetraglyme in electrolytic solution obtained by mixing a glyme having a high boiling point and a high flash point with a lithium salt.

PRIOR ART LITERATURE

Patent Literature

PTL 1: JP-A-2015-216124

SUMMARY OF INVENTION

Technical Problem

The mixed solution of triglyme and lithium bis(fluorosulfonyl)imide in Patent Literature 1 has a low ion conductivity of lithium ions due to its high viscosity. In order to improve the ion conductivity, it is desirable to add an organic solvent having a low viscosity such as a carbonate-based solvent (for example, dimethyl carbonate, ethylene carbonate, propylene carbonate). However, although the low flash point and the low ionic conductivity at low temperatures can be prevented when propylene carbonate, for example, is added as the organic solvent having a low viscosity, when graphite is contained in a negative electrode, the propylene carbonate may be decomposed and the battery capacity may decrease depending on the addition amount of the propylene carbonate.

It is an object of the invention to improve the battery capacity of a secondary battery.

Solution to Problem

The characteristics of the invention for solving the above problem are as follows, for example.

A semisolid electrolyte solution includes: a solvated electrolyte salt; and an ether-based solvent that constitutes the solvated electrolyte salt and a solvated ion liquid, in which a mixing ratio of the ether-based solvent to the solvated electrolyte salt is larger than 0 and equal to or less than 0.5 in terms of a molar ratio.

The present description includes the disclosure content of Japanese Patent Application No. 2017-113117, which is the basis for the priority of the present application.

Advantageous Effect

According to the invention, the battery capacity of a secondary battery can be improved. Problems, configurations, and effects other than the above ones will become apparent from the following description of embodiments.

BRIEF DESCRIPTION OF DRAWINGS

FIG. 2 is a table showing results of Examples and Comparative Examples.

DESCRIPTION OF EMBODIMENTS

Figure 1:
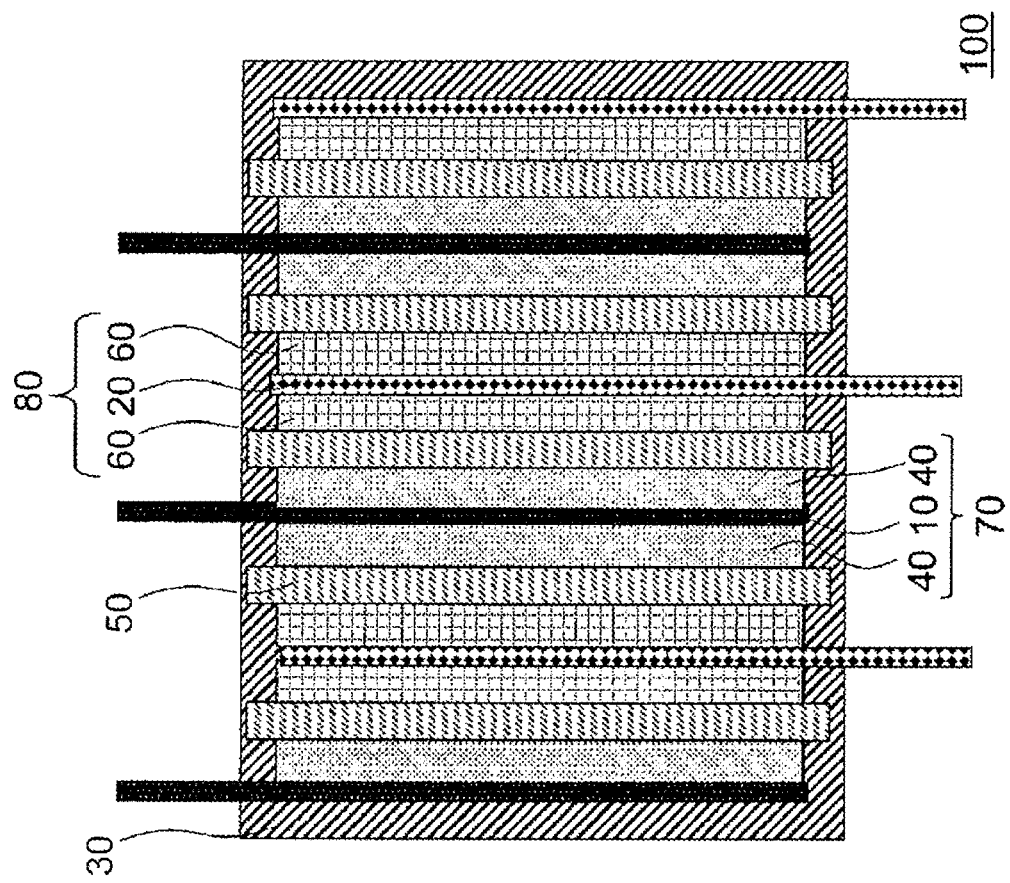
FIG. 1 is a cross-sectional view of a secondary battery.

Hereinafter, embodiments of the invention will be described below with reference to the drawings and the like. The following description shows specific examples of contents of the invention, and the invention is not limited thereto and various changes and modifications can be made by those skilled in the art within the scope of the technical idea disclosed in the description. In addition, in all the drawings for explaining the invention, those having the same functions are denoted by the same numerals and repeated descriptions thereof may be omitted.

The expression "to" described in the description is used with a meaning of including numerical values described therebefore and thereafter as a lower limit value and an upper limit value. In the numerical ranges described stepwise in the description, an upper limit value or a lower limit value described in one numerical range may be replaced with another upper limit value or lower limit value described stepwise. An upper limit value or a lower limit value of the numerical ranges described in the description may be replaced with a value shown in the examples.

In this specification, a lithium ion secondary battery will be described as an example of a secondary battery. The lithium ion secondary battery is an electrochemical device that can store or utilize electrical energy by occluding lithium ions from an electrode in a non-aqueous electrolyte and releasing lithium ions to the electrode. It is also referred to as other names of a lithium ion battery, a non-aqueous electrolyte secondary battery, and a non-aqueous electrolytic solution secondary battery, any of which is an object of the invention. The technical idea of the invention can also be applied to a sodium ion secondary battery, a magnesium ion secondary battery, an aluminum ion secondary battery, and the like in addition to the lithium ion secondary battery.

FIG. 1 is a cross-sectional view of a secondary battery according to one embodiment of the invention. FIG. 1 is a stacked type secondary battery, in which a secondary battery 100 includes a positive electrode 70, a negative electrode 80, a battery case 30, and a semisolid electrolyte layer 50. The battery case 30 houses the semisolid electrolyte layer 50, the positive electrode 70, and the negative electrode 80. A material of the battery case 30 may be selected from materials having corrosion resistance to non-aqueous electrolytes such as aluminum, stainless steel, nickel-plated steel, and the like. The invention is also applicable to a winding-type secondary battery.

Electrode bodies each including the positive electrode 70, the semisolid electrolyte layer 50, and the negative electrode 80 are stacked in the secondary battery 100.

The positive electrode 70 includes a positive electrode current collector 10 and positive electrode mixture layers 40. The positive electrode mixture layers 40 are formed on both surfaces of the positive electrode current collector 10. The negative electrode 80 includes a negative electrode current collector 20 and negative electrode mixture layers 60. The negative electrode mixture layers 60 are formed on both surfaces of the negative electrode current collector 20.

The positive electrode current collector 10 and the negative electrode current collector 20 protrude outward from the battery case 30, and a plurality of protruding positive electrode current collectors 10 and a plurality of negative electrode current collectors 20 are separately bonded by, for example, ultrasonic bonding, so that a parallel connection is formed in the secondary battery 100. The invention is also applicable to a bipolar type secondary battery in which an electrical series connection is formed in the secondary battery 100. The positive electrode 70 or the negative electrode 80 may be referred to as an electrode, the positive electrode mixture layer 40 or the negative electrode mixture layer 60 may be referred to as an electrode mixture layer, and the positive electrode current collector 10 or the negative electrode current collector 20 may be referred to as an electrode current collector.

The positive electrode mixture layer 40 includes a positive electrode active substance, a positive electrode conductive agent, and a positive electrode binder. The negative electrode mixture layer 60 includes a negative electrode active substance, a negative electrode conductive agent, and a negative electrode binder. The semisolid electrolyte layer 50 includes a semisolid electrolyte binder and a semisolid electrolyte. The semisolid electrolyte includes carrier particles and semisolid electrolyte solution. The positive electrode active substance or the negative electrode active substance may be referred to as an electrode active substance, a positive electrode conductive agent or a negative electrode conductive agent may be referred to as an electrode conductive agent, and a positive electrode binder or a negative electrode binder may be referred to as an electrode binder.

The semisolid electrolyte layer 50 includes the semisolid electrolyte that includes the semisolid electrolyte solution and the carrier particles. A characteristic of the semisolid electrolyte layer 50 is that there is almost no flowable semisolid electrolyte, and thus the semisolid electrolyte solution is unlikely to leak out. The semisolid electrolyte layer 50 is a medium that transmits lithium ions between the positive electrode 70 and the negative electrode 80. The semisolid electrolyte layer 50 also acts as an electron insulator to prevent a short circuit between the positive electrode 70 and the negative electrode 80.

When filling pores of the electrode mixture layer with the semisolid electrolyte solution, the semisolid electrolyte solution may be added to the electrode mixture layer to fill fine pores of the electrode mixture layer. At this time, particles such as the electrode active substance and the electrode conductive agent in the electrode mixture layer function as carrier particles and retain the semisolid electrolyte solution without requiring the carrier particles contained in the semisolid electrolyte. As another method of filling the fine pores of the electrode mixture layer with the semisolid electrolyte solution, a slurry is prepared in which the semisolid electrolyte solution, the electrode active substance, the electrode conductive agent, and the electrode binder are mixed, and the adjusted slurry is coated together onto the electrode current collector.

Electrode Conductive Agent

The electrode conductive agent improves conductivity of the electrode mixture layer. Examples of the electrode conductive agent include, but are not limited to, ketjen black, acetylene black and the like.

Electrode Binder

The electrode binder binds the electrode active substance, an electrode conductive agent, and the like in the electrode. Examples of the electrode binder include, but are not limited to, styrene-butadiene rubber, carboxymethyl cellulose, polyvinylidene fluoride (PVDF), and a mixture thereof.

Positive Electrode Active Substance

In the positive electrode active substance, lithium ions are desorbed in a charging process, and lithium ions desorbed from the negative electrode active substance in the negative electrode mixture layer 60 are inserted in a discharging process. A lithium composite oxide containing a transition metal is preferably a material of the positive electrode active substance, and specific examples thereof include, but are not limited to, $LiCoO_2$, $LiNiO_2$, $LiMn_2O_4$, $LiMnO_3$, $LiMn_2O_3$, $LiMnO_2$, $Li_4Mn_5O_{12}$, and $LiMn_{2-x}MxO_2$ (in which M=Co, Ni, Fe, Cr, Zn, Ta, x=0.01 to 0.2), $Li_2Mn_3MO_8$ (in which M=Fe, Co, Ni, Cu, Zn), $Li_{1-x}A_xMn_2O_4$ (in which A=Mg, B, Al, Fe, Co, Ni, Cr, Zn, Ca, x=0.01 to 0.1), $LiNi_{1-x}M_xO_2$ (in which M=Co, Fe, Ga, x=0.01 to 0.2), $LiFeO_2$, $Fe_2(SO_4)_3$, $LiCo_{1-x}M_xP_2$ (in which M=Ni, Fe, Mn, x=0.01 to 0.2), $LiNi_{1-x}M_xO_2$ (in which m=Mn, Fe, Co, Al, Ga, Ca, Mg, x=0.01 to 0.2), $Fe(MoO_4)_3$, $FeF_3$, $LiFePO_4$, $LiMnPO_4$, and the like.

Positive Electrode Current Collector 10

Examples of the positive electrode current collector 10 include an aluminum foil having a thickness of 10 to 100 µm, an aluminum perforated foil having a thickness of 10 to 100 µm and a hole with a hole diameter of 0.1 to 10 mm, an expanded metal, a foamed metal plate, and the like, and stainless steel, titanium, and the like can also be used as a material in addition to aluminum. Any positive electrode current collector 10 can be used without being limited to material, shapes, manufacturing methods, or the like.

Positive Electrode 70

After the positive electrode slurry obtained by mixing the positive electrode active substance, the positive electrode conductive agent, the positive electrode binder, and the organic solvent is coated to the positive electrode current collector 10 by a doctor blade method, a dipping method, a spray method, or the like, the organic solvent is dried and pressure-molded by a roll press to produce the positive electrode 70. A plurality of positive electrode mixture layers 40 may be stacked on the positive electrode current collector 10 by performing coating to drying for a plurality of times. A thickness of the positive electrode mixture layer 40 is desired to be equal to or larger than an average particle diameter of the positive electrode active substance. This is because, when the thickness of the positive electrode mixture layer 40 is smaller than the average particle diameter of the positive electrode active substance, electron conductivity between adjacent positive electrode active substances deteriorates.

Negative Electrode Active Substance

In the negative electrode active substance, lithium ions are desorbed in a discharging process, and lithium ions desorbed from the positive electrode active substance in the positive electrode mixture layer 40 are inserted in a charging process. Examples of the material of the negative electrode active substance include, but are not limited to, carbon-based materials (for example, graphite, graphitizable carbon materials, and amorphous carbon materials), conductive polymer materials (for example, polyacene, polyparaphenylene, polyaniline, polyacetylene), lithium composite oxide (for example, lithium titanate: $Li_4Ti_5O_{12}$), metal lithium, and a metal (for example, aluminum, silicon, or tin) to be alloyed with lithium.

Negative Electrode Current Collector 20

Examples of the negative electrode current collector 20 include a copper foil having a thickness of 10 to 100 μm, a copper piercing foil having a thickness of 10 to 100 μm and a hole with a hole diameter of 0.1 to 10 mm, an expanded metal, a foamed metal plate, and the like, and stainless steel, titanium, nickel, and the like are also applicable in addition to copper. Any negative electrode current collector 20 can be used without being limited to material, shapes, manufacturing methods, or the like.

Negative Electrode 80

After the negative electrode slurry obtained by mixing the negative electrode active material, the negative electrode conductive agent, and the organic solvent containing a small amount of water is coated to the negative electrode current collector 20 by a doctor blade method, a dipping method, a spray method, or the like, the organic solvent is dried and pressure-molded by a roll press to produce the negative electrode 80. A plurality of negative electrode mixture layers 60 may be stacked on the negative electrode current collector 20 by performing coating to drying for a plurality of times. The thickness of the negative electrode mixture layer 60 is preferably equal to or larger than an average particle diameter of the negative electrode active substance. This is because, when the thickness of the negative electrode mixture layer 60 is smaller than the average particle diameter of the negative electrode active substance, electron conductivity between adjacent negative electrode active substances deteriorates.

Carrier Particles

From a viewpoint of electrochemical stability, the carrier particles are preferably insulating particles and are insoluble in a semisolid electrolyte solution containing an organic solvent or an ion liquid. Example of the carrier particles includes oxide inorganic particles such as silica ($SiO_2$) particles, γ-alumina ($Al_2O_3$) particles, ceria ($CeO_2$) particles, and zirconia ($ZrO_2$) particles. In addition, other known metal oxide particles may also be used.

Since a carrying amount of the semisolid electrolyte solution is considered to be proportional to a specific surface area of the carrier particles, an average particle diameter of primary particles of the carrier particles is preferably 1 nm to 10 μm. When the average particle size of the primary particles of the carrier particles is large, the carrier particles cannot properly retain a sufficient amount of the semisolid electrolyte solution, and formation of the semisolid electrolyte may be difficult. On the other hand, when the average particle diameter of the primary particles of the carrier particles is small, a surface force between the carrier particles increases, and the carrier particles are likely to aggregate, making it difficult to form the semisolid electrolyte. The average particle diameter of the primary particles of the carrier particles is more preferably from 1 nm to 50 nm, and still more preferably from 1 nm to 10 nm. The average particle diameter of the primary particles of the carrier particles can be measured using a known particle size distribution analyzing device by a laser scattering method.

Semisolid Electrolyte Solution

The semisolid electrolyte solution includes a semisolid electrolyte solvent, a low viscosity solvent, any additive, and any electrolyte salt. The semisolid electrolyte solvent includes a mixture (complex) of an ether-based solvent and a solvated electrolyte salt, which shows similar properties to ion liquid. The ion liquid is a compound that dissociates into cations and anions at room temperature and maintains a state of the liquid. The ion liquid may be referred to as an ionic liquid, a low melting point molten salt, or a room temperature molten salt. From the viewpoint of stability in the atmosphere and heat resistance in the secondary battery, it is desirable that the semisolid electrolyte solvent has low volatility, specifically, a vapor pressure at a room temperature of equal to or less than 150 Pa.

When the semisolid electrolyte solution is contained in the electrode mixture layer, the content of the semisolid electrolyte solution in the electrode mixture layer is desired to be 20% by volume to 40% by volume. When the content of the semisolid electrolyte solution is small, the ion conduction path inside the electrode mixture layer may not be sufficiently formed and the rate characteristic may be lowered. In addition, when the content of the semisolid electrolyte solution is large, the semisolid electrolyte solution may leak out from the electrode mixture layer.

The ether-based solvent constitutes a solvated electrolyte salt and solvated ion liquid. As the ether-based solvent, a known glyme (generic name for symmetric glycol diether represented by $R-O(CH_2CH_2O)_n-R'$ (R and R' are saturated hydrocarbons, and n is an integer) showing properties similar to ion liquid can be used. From a viewpoint of ion conductivity, tetraglyme (tetraethylene dimethyl glycol, G4), triglyme (triethylene glycol dimethyl ether, G3), pentaglyme (pentaethylene glycol dimethyl ether, G5), and hexaglyme (hexaethylene glycol dimethyl ether, G6) can be used. These glymes may be used alone or in combination. In addition, as the ether-based solvent, a crown ether (generic name of macrocyclic ether represented by $(-CH_2-CH_2-O)_n$ (n is an integer)) can be used. Specifically, 12-crown-4, 15-crown-5, 18-crown-6, dibenzo-18-crown-6, and the like can be used, but the invention is not limited thereto. These crown ethers may be used alone or in combination. It is preferable to use tetraglyme and triglyme from a point of forming the complex structure and the solvated electrolyte salt.

Examples of the solvated electrolyte salt include, but are not limited to, lithium imide salts such as lithium bis(fluorosulfonyl)imide (LiFSI), lithium bis(trifluoromethanesulfonyl)imide (LiTFSI), and lithium bis(pentafluoroethanesulfonyl)imide (LiBETI). As the semisolid electrolyte solvent, a mixture of an ether-based solvent and a solvated electrolyte salt may be used alone or in combination.

Examples of the electrolyte salt include $LiPF_6$, $LiBF_4$, $LiClO_4$, $LiCF_3SO_3$, $LiCF_3CO_2$, $LiAsF_6$, $LiSbF_6$, lithium bis oxalato borate (LiBOB), LiFSI, LiTFSI, LiBTFI, and the like. These electrolyte salts may be used alone or in combination.

<Low Viscosity Solvent>

The low viscosity solvent reduces viscosity of the semisolid electrolyte solution to promote lithium ion conduction, thereby improving output characteristics such as the rate characteristic of the secondary battery. Examples of the low viscosity solvent include organic solvents such as propylene carbonate, ethylene carbonate, dimethyl carbonate, and ion liquid such as N,N-diethyl-N-methyl-N-(2-methoxyethyl) ammonium bis(trifluoromethanesulfonyl)imide, hydrofluoroethers (for example, 1,1,2,2-tetrafluoroethyl-2,2,3,3-tetrafluoropropyl ether), and the like. It is desirable that the low viscosity solvent has a viscosity lower than a mixed solution of an ether-based solvent and a solvated electrolyte salt. It is also desirable not to greatly disturb a solvated structure between the ether-based solvent and the solvated electrolyte salt. Specifically, those having substantially the same number of donors as ether-based solvents such as glymes or crown ether, or those having a small number of donors may be preferable, for example, propylene carbonate, ethylene carbonate, acetonitrile, dichloroethane, dimethyl carbonate, and 1,1,2,2-tetrafluoroethyl-2,2,3,3-tetrafluoropropyl ether. These low viscosity solvents may be used alone or in combination. Among these, the ethylene carbonate is preferable, and the propylene carbonate is particularly preferable. The ethylene carbonate and the propylene carbonate have a high boiling point and are unlikely to volatilize when the low viscosity solvent is contained in the electrode and are unlikely to be affected by a composition change of the semisolid electrolyte solution due to volatilization.

Mixing Ratio

A mixing ratio of the ether-based solvent to the solvated electrolyte salt is preferably larger than 0 and equal to or less than 0.5, more preferably 0.2 to 0.5, and still more preferably 0.3 to 0.4 in terms of the molar ratio. When the addition amount of the ether-based solvent is small, for example, when the graphite is used for the negative electrode 80, reductive decomposition of the low viscosity solvent may proceed. In addition, when the addition amount of the ether-based solvent added is large, reductive decomposition due to the ether may proceed, which may lead to a decrease in battery life.

A mixing ratio of the low viscosity solvent to the solvated electrolyte salt is preferably 2 to 6, and particularly preferably 3 to 5 in terms of the molar ratio. When the addition amount of the low viscosity solvent is small, the output characteristic of the secondary battery may be low. In addition, when the addition amount of the low viscosity solvent is large, the reductive reaction of the low viscosity solvent in the negative electrode 80 containing the graphite is likely to proceed, and the life of the secondary battery may be reduced.

Additive

The inclusion of an additive in the semisolid electrolyte may be desired to improve the rate characteristic of the secondary battery and improve the battery life. The amount of the additive added is preferably equal to or less than 30 mass percent and particularly preferably equal to or less than 10 mass percent with respect to a weight of the semisolid electrolyte solution. If the amount of the additive added is equal to or less than 30 mass percent, the glyme or the solvated structure of the crown ether-based solvent and the solvated electrolyte salt is not greatly disturbed even if the additive is introduced. Examples of the additive include vinylene carbonate, fluoroethylene carbonate, and the like. These additives may be used alone or in combination.

Semisolid Electrolyte Binder

As the semisolid electrolyte binder, a fluorine-based resin is preferably used. As the fluorine-based resin, polytetrafluoroethylene (PTFE) is preferably used. The use of PTFE improves adhesion between the semisolid electrolyte layer 50 and the electrode current collector, thereby improving battery performance.

Semisolid Electrolyte

The semisolid electrolyte solution includes the semisolid electrolyte carried on or held by the carrier particles. In a method for producing the semisolid electrolyte, for example, the semisolid electrolyte solution and the carrier particles are mixed at a specific volume ratio and an organic solvent such as methanol is added and mixed in order to prepare a semisolid electrolyte slurry. Thereafter, the slurry is spread in a petri dish and the organic solvent is distilled off, so that a semisolid electrolyte powder is obtained.

Semisolid Electrolyte Layer 50

Examples of a method for producing the semisolid electrolyte layer 50 include a method of compression-molding the semisolid electrolyte powder into a pellet shape with a molding dice or the like, a method of adding and mixing the semisolid electrolyte binder to the semisolid electrolyte powder so as to form a sheet, or the like. By adding and mixing the electrolyte binder powder to the semisolid electrolyte, the highly flexible sheet-like semisolid electrolyte layer 50 can be prepared. In addition, the semisolid electrolyte layer 50 can be prepared by adding and mixing a binder solution in which the semisolid electrolyte binder is dissolved in a dispersion solvent in the semisolid electrolyte and distilling off the dispersion solvent. The semisolid electrolyte layer 50 may also be prepared by adding and mixing the binder solution to the semisolid electrolyte described above and coating and drying the mixture.

A separator such as a microporous membrane may be used as the semisolid electrolyte layer 50. Polyolefins such as polyethylene or polypropylene, and glass fibers can be used as the separator. When the microporous membrane is used for the separator, the semisolid electrolyte solution is filled in the secondary battery 100 by injecting the semisolid electrolyte solution into the secondary battery 100 from one vacant side or a liquid injection hole of the battery case 30.

The content of the semisolid electrolyte solution in the semisolid electrolyte layer 50 is desired to be 70% by volume to 90% by volume. When the content of the semisolid electrolyte solution is small, interface resistance between the electrode and the semisolid electrolyte layer 50 may increase. In addition, when the content of the semisolid electrolyte is large, the semisolid electrolyte solution may leak out from the semisolid electrolyte layer 50.

EXAMPLES

Hereinafter, the invention is described more specifically below by referring to examples, but the invention is not limited thereto.

Example 1

Semisolid Electrolyte Solution

The semisolid electrolyte solution was prepared by mixing lithium bis(trifluoromethanesulfonyl)imide (LiTFSI), tetraglyme (G4) and propylene carbonate (PC) at a molar ratio of 1:0.5:4 and stirring and dissolving the mixture using a magnetic stirrer in a glass bottle.

Negative Electrode 80

A slurry-like solution was prepared by mixing graphite (amorphous coating, average particle diameter: 10 μm), polyvinylidene fluoride (PVDF), and a conductive additive (acetylene black) at a weight ratio of 88:10:2 and adding and further mixing N-methyl-2-pyrrolidone. The prepared slurry was coated to the negative electrode current collector 20 made of SUS foil having a thickness of 10 μm using a doctor blade, and dried at 80° C. for equal to or more than 2 hours. At this time, the coating amount of the slurry was adjusted such that the weight of the negative electrode mixture layer 60 per 1 cm$^2$ after drying was 8 mg/cm$^2$. The dried electrode was pressurized to a density of 1.5 g/cm$^3$ and punched out at ϕ13 mm to obtain the negative electrode 80.

Secondary Battery 100

The prepared negative electrode 80 was dried at 100° C. for equal to or more than 2 hours and then transferred into a glove box filled with argon. Next, an appropriate amount of the semisolid electrolyte solution was added to the negative electrode 80 and a polypropylene separator having a thickness of 30 μm and the semisolid electrolyte solution was infiltrated into the negative electrode 80 and the separator. Then, the negative electrode 80 was disposed on one surface of the separator and lithium metal was disposed on the other surface, which were put in such a state into a 2032 size coin-type battery cell holder and sealed with a caulking machine, so that the secondary battery 100 was prepared.

Examples 2 to 4

The secondary battery 100 was prepared in the same manner as in Example 1 except that a mixed molar ratio of LiTFSI, G4, and PC in the semisolid electrolyte solution was changed as shown in FIG. 2.

Example 5

Semisolid Electrolyte

Instead of using the separator, the semisolid electrolyte and the semisolid electrolyte layer 50 were prepared according to the following procedure. First, LiTFSI, G4, and PC were mixed to prepare the semisolid electrolyte solution. In a glove box with argon atmosphere, the semisolid electrolyte solution and SiO$_2$ nanoparticles (particle size: 7 nm) were mixed at a volume fraction of 80:20, methanol was added thereto, and then the mixture was stirred by using a magnet stirrer for 30 minutes. Thereafter, the obtained mixed liquid was spread to a petri dish and the methanol was distilled off to obtain the powdery semisolid electrolyte. The sheet-like semisolid electrolyte layer 50 having a thickness of about 200 μm was obtained by adding 5 mass % of PTFE powder to the powder, mixing the mixed powder well and stretching the mixed powder under pressure. The obtained semisolid electrolyte layer 50 was punched out at a size of 15 mm. The molar ratio of LiTFSI, G4, and PC in the semisolid electrolyte layer 50 was 1:0.5:4.

Positive Electrode 70

A slurry-like solution was prepared by mixing a positive electrode active substance LiNiMnCoO$_2$ (NCM), polyvinylidene fluoride (PVDF), and a conductive additive (acetylene black) at a weight ratio of 84:9:7, and further adding and mixing N-methyl-2-pyrrolidone. The prepared slurry was coated to the positive electrode current collector 10 made of SUS foil having a thickness of 10 μm using a doctor blade, and dried at 80° C. for equal to or more than 2 hours. At this time, the coating amount of the slurry was adjusted such that the weight of the positive electrode mixture layer 40 per 1 cm$^2$ after drying was 18 mg/cm$^2$. The dried electrode was pressurized to a density of 2.5 g/cm$^3$ and punched at ϕ13 mm to form the positive electrode 70.

Secondary Battery 100

The secondary battery 100 was prepared in the same manner as in Example 1 by using the positive electrode 70 instead of the lithium metal of Example 1 and the semisolid electrolyte layer 50 instead of a separator.

Examples 6 to 14

The secondary battery 100 was prepared in the same manner as in Example 5 except that the mixed molar ratio of LiTFSI, G4, and PC in the semisolid electrolyte solution was changed as shown in FIG. 2.

Comparative Examples 1 to 6

The secondary battery 100 was prepared in the same manner as in Example 1 except that the mixed molar ratio of LiTFSI, G4, and PC in the semisolid electrolyte solution was changed as shown in FIG. 2.

Battery Capacity Evaluation

The battery capacity of the secondary battery 100 was measured at 25° C. and 50° C. for the secondary battery 100 in examples using a separator. A 1480 potentiostat manufactured by Solartron Corporation was used to charge the secondary battery 100 at 0.05 C rate. Thereafter, the battery was stopped in an open circuit state for 1 hour and then discharged at 0.05 C rate. At the time of charging and discharging, the secondary battery 100 was charged at a constant current of 0.05 C rate until a potential between electrodes of the secondary battery 100 reached 0.005 V and then charged at the potential of 0.005 V until the current value reached 0.005 C rate (constant current constant voltage charging). At the time of discharging, the battery was discharged at a constant current of 0.05 C rate until 1.5 V (constant current discharge).

The battery capacity of the secondary battery 100 was measured at 25° C. for the secondary battery 100 in examples using the semisolid electrolyte layer 50. Things are the same as those using the separator except for the following points. At the time of charging and discharging, the secondary battery 100 was charged at a constant current of 0.05 C rate until a potential between the electrodes of the secondary battery 100 reached 4.2 V and then charged at the potential of 4.2 V until the current value reached 0.005 C rate. At the time of discharging, the battery was discharged at a constant current of 0.05 C rate until 2.7 V.

Evaluation of Cycle Characteristics

Initial coulombic efficiency was evaluated from a ratio between the charge capacity and the discharge capacity after initial charge and discharge was performed at the time of the battery capacity evaluation. Similarly, coulombic efficiency at 10 cycles was evaluated from the charge and discharge results after 10 cycles. After the charging and after the discharge during the test, the secondary battery 100 was stopped for one hour in the open circuit state.

Results and Discussion of Results

The battery capacity and cycle characteristics of the secondary battery 100 are shown in FIG. 2. It is considered that the battery capacity of the secondary battery 100 is strongly influenced by the initial coulombic efficiency, and the life of the secondary battery 100 is strongly influenced by the coulombic efficiency at 10 cycles. Therefore, an evaluation criteria for battery capacity includes a condition that the coulombic efficiency at the time of initial charge and discharge was equal to or more than 80.5%, and an evaluation criteria for the battery life includes a condition that the coulombic efficiency at 10 cycles was equal to or more than 98.5%. The secondary battery of the examples had superior battery capacity and life as compared with a secondary battery of comparative examples.

REFERENCE SIGN LIST

10 positive electrode current collector
20 negative electrode current collector
30 battery case
40 positive electrode mixture layer
50 semisolid electrolyte layer
60 negative electrode mixture layer
70 positive electrode
80 negative electrode
100 secondary battery All publications, patents, and patent applications cited in the description are hereby directly incorporated in the description by reference.

The invention claimed is:

1. A semisolid electrolyte solution comprising:
   a solvated electrolyte salt;
   an ether-based solvent that constitutes the solvated electrolyte salt and a solvated ion liquid, and
   a low viscosity solvent having a lower viscosity than a mixed solution of the ether-based solvent and the solvated electrolyte salt, wherein
   a mixing ratio of the low viscosity solvent to the solvated electrolyte salt is 2 to 6 in terms of the molar ratio, and
   a mixing ratio of the ether-based solvent to the solvated electrolyte salt is larger than 0 and less than 0.5 in terms of a molar ratio,
   wherein the ether-based solvent is a glyme represented by R—O(CH$_2$CH$_2$O)$_n$—R', in which R and R' are saturated hydrocarbons and n is an integer.

2. The semisolid electrolyte solution according to claim 1, wherein
   the mixing ratio of the ether-based solvent to the solvated electrolyte salt is 0.2 to less than 0.5 in terms of the molar ratio.

3. The semisolid electrolyte solution according to claim 1, further comprising:
   an additive.

4. The semisolid electrolyte solution according to claim 1, wherein
   the solvated electrolyte salt is a lithium imide salt.

5. The semisolid electrolyte solution according to claim 1, wherein
   the low viscosity solvent is propylene carbonate or ethylene carbonate.

6. A semisolid electrolyte comprising:
   the semisolid electrolyte solution according to claim 1; and
   carrier particles, wherein
   the semisolid electrolyte solution is carried on the carrier particles.

7. A semisolid electrolyte layer comprising:
   the semisolid electrolyte according to claim 6 and a semisolid electrolyte binder.

8. An electrode comprising:
   the semisolid electrolyte solution according to claim 1.

9. A secondary battery comprising: a positive electrode, a negative electrode, and the semisolid electrolyte layer according to claim 7.

* * * * *